July 6, 1926.  
O. C. WILLIAMS  
ARTIFICIAL ANIMAL  
Filed March 6, 1922

INVENTOR.  
OSCAR C. WILLIAMS.  
BY A. B. Bonman  
ATTORNEY

Patented July 6, 1926.

1,591,905

UNITED STATES PATENT OFFICE.

OSCAR C. WILLIAMS, OF SAN DIEGO, CALIFORNIA.

ARTIFICIAL ANIMAL.

Application filed March 6, 1922. Serial No. 541,326.

My invention relates to artificial animals with movable limbs and members operated by natural animals or insects and the objects of my invention are: First, to provide an animal of this class which in appearance resembles a natural animal and in which the limbs or members are movable substantially as those of the natural animal; second, to provide an animal of this class in which the limbs and members are pivotally, revolubly and reciprocably mounted in the body thereof to obtain a variety of motion of said limbs and members; third, to provide an animal of this classs in which the interior of the body portion or the parts containing movable members are made hollow so as to provide ample space for the movement and operation of the natural animals or insects placed within said hollow portion; fourth, to provide an animal of this class in which means are provided to keep the natural animal or insect in the interior thereof in motion and thus provide continuous movement of the said limbs or members; fifth, to provide an animal of this class with a convenient and novel means of entrance and exit of said natural animals or insects; sixth, to provide an animal of this class which is novelly constructed and seventh, to provide an animal of this class which is very simple and economical of construction, durable, and which will not readily deteriorate or get out of order.

Figure 1:
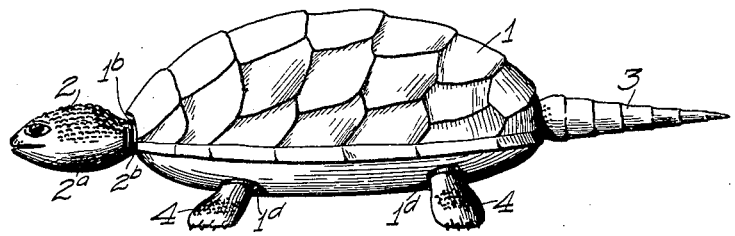
Figure 2:
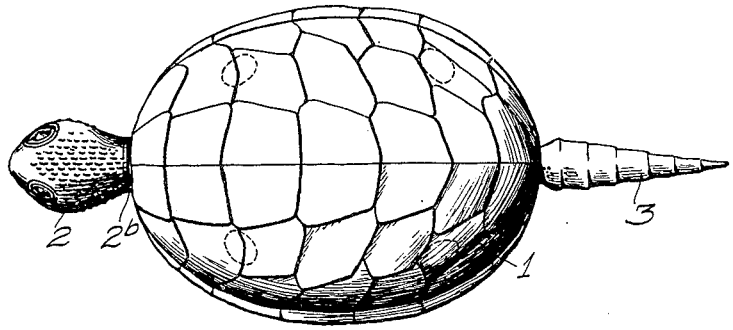
Figure 3:
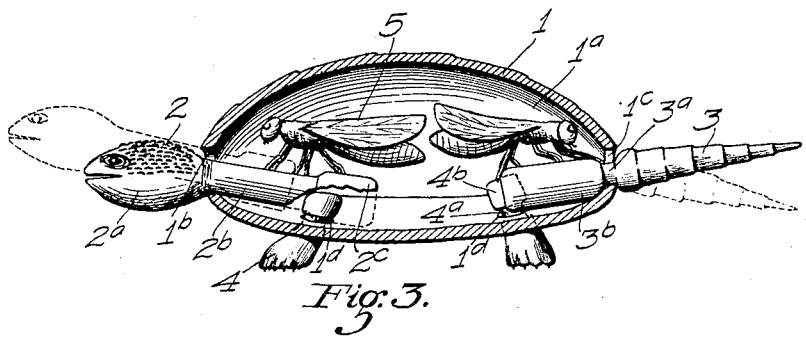

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a side elevational view of an artificial turtle with the limbs and members in natural position; Fig. 2 is a plan or top view thereof; Fig. 3 is a sectional elevational view of the turtle through 3—3 of Fig. 2 showing some of the parts in elevation to facilitate the illustration, showing the insects therein and showing by solid and dotted lines varying operative positions of the members.

Like characters of reference refer to similar parts and portions throughout the several views of the drawings.

The body part 1, head member 2, tail member 3, leg member 4, and the flies 5 constitute the principal parts and portions of my artificial turtle.

The body part 1 is shaped substantially as the body of a natural turtle and provided with impressions or designs on the back and bottom thereof to convey an impression of a natural turtle. Said body part may be made of any material, such as wood, sheet metal, hard rubber, nutshells, or from the shell of a natural turtle. The interior $1^a$ of the body part is hollow to receive and provide ample room for the movement and operation of the flies 5 introduced therein. The said body part 1 is provided with holes $1^b$, $1^c$ and $1^d$ adapted to receive respectively, the head member 2, the tail member 3 and the leg members 4. The holes $1^b$ and $1^d$ are preferably made elliptical in shape to prevent the head and leg members turning completely around in said holes. The head, tail and leg members are preferably made of a very light material so that they an be readily moved by the flies 5 introduced in the interior $1^a$ of the body part. The head member 2 is provided with a head portion $2^a$ to represent the natural head of a turtle and an elongated portion $2^b$ to represent the stretched neck of the turtle when said member 2 is forced out as shown by the dotted lines of said member in Fig. 3 of the drawings. Said head member 2 is further provided with an enlarged portion $2^d$ at the opposite end of the head portion $2^a$ but slightly smaller than the hole $1^b$ provided for the head member 2 so that said member may be readily introduced through the opening or hole $1^b$ with a slight pressure. It will be here noted that ample clearance is provided between the hole $1^b$ of the body part and the neck portion $2^c$ of the head member 2 so that said head member may be turned in any direction and also conveniently forced in and out, limited by the enlarged head portion $2^a$ and enlarged rear portion $2^c$ of the head. The tail and leg members are similarly constructed except that they are provided with grooves $3^a$ and $4^a$ respectively instead of an elongated portion $2^b$ on said head member 2. Enlarged portions $3^b$ and $4^b$ are provided on the interior ends of said tail and leg members respectively, however, small enough so that they may be readily introduced into the holes $1^c$ and $1^d$ in the body portion of said turtle with a slight pressure but conveniently retained in said body portion by reason of said enlarged portions. Said tail and leg members being pivotally mounted at the groove therein in the holes provided for the same in the body of said turtle substantially as described and shown may be moved or swung freely about said pivot points.

It will be noted that the movable members are approximately balanced so that they are easily moved by small flies or insects. It will be here noted that an animal or insect seeks the light and since a space is provided between the reduced portions of the head, tail and leg members and the holes of the body portion retaining the same, rays of light are admitted in each instance and the flies 5 introduced therein will be attracted by said rays of light and seek said openings, scampering around on the various members moving and operating the same in various directions.

It will be further noted that since the members 3, 4 and 5 can conveniently be introduced and withdrawn from their respective openings, that said openings form convenient means for the introduction and exit of the flies into and from said body part.

Though I have shown and described a particular construction, combination and arrangement of parts and portions I do not wish to be limited to this particular construction, combination and arrangement but desire to include in the scope of my invention the construction, combination and arrangement substantially as set forth in the appended claims.

Having thus described my invention what I claim as new and desire to secure by Letters Patent is:

1. In an artificial animal of the class described, the combination of a hollow body part provided with apertures in its walls, members movably mounted relatively to said body part and extending within the same and approximately balanced in said apertures in the wall of said body part, and natural animals concealed in said artificial animal adapted to engage the ends of said members and move the same.

2. In an artificial animal of the class decribed, the combination of a hollow body part provided with apertures in its walls, members movably mounted relatively to said body part and extending within the same and approximately balanced in said apertures in the wall of said body part, one of which members is removable therefrom to admit natural animals, and natural animals concealed in said artificial animal adapted to engage the inner ends of said members and move the same.

3. In an artificial animal of the class described, the combination of a hollow body part provided with holes in the walls thereof, members with reduced portions intermediate their ends pivotally mounted in said holes, and natural insects positioned in said hollow body member of the proper relative size to engage the inner ends of said members and move them about in the holes in which they are mounted.

4. In an artificial animal of the class described, the combination of a hollow body part provided with holes, and body members provided with member portions, reduced portions extending through and pivoted in the holes of said body part and enlarged portions on the extended inner ends of said members adapted to retain said members within said body portion and adapted to be operated by natural animals concealed in said body part, one of said body members being removable from said body portion providing entrance and exit means for said animals, the reduced portions of said body members and the hole portions of said hollow body part forming openings from the interior to the exterior thereof whereby light is admitted to the natural animals placed in the artificial animal keeping the former in motion in an effort to escape.

5. In an artificial animal of the class described, the combination of a hollow body part provided with holes in the wall thereof, body members provided with member portions, reduced portions extending through, balanced and pivoted in the holes of said body part and enlarged portions on the extended inner ends of said members adapted to retain said members within said body part, there being provided openings contiguous to said body members whereby light is admitted to natural animals adapted to be positioned in the interior of said artificial animal, keeping the same in motion in an effort to escape, whereby said members are operated.

6. A toy in the semblance of an animal and comprising a hollow body provided with openings, members simulating the external members of the animal and retained in said openings for free irregular movement therein, the inner ends of said members projecting within the body, one of said openings providing for the insertion of an insect therethrough, and the body and inner ends of the members being so related in size to the insect thus inserted that the inner ends of the members will be agitated by the insect confined therein.

In testimony whereof, I have hereunto set my hand at San Diego, California this 25th day of February, 1922.

OSCAR C. WILLIAMS.